Nov. 29, 1966 R. T. HEADRICK 3,288,186
SURGE DAMPING BAFFLE FOR LIQUID STORAGE TANK
Filed June 5, 1964 2 Sheets-Sheet 1
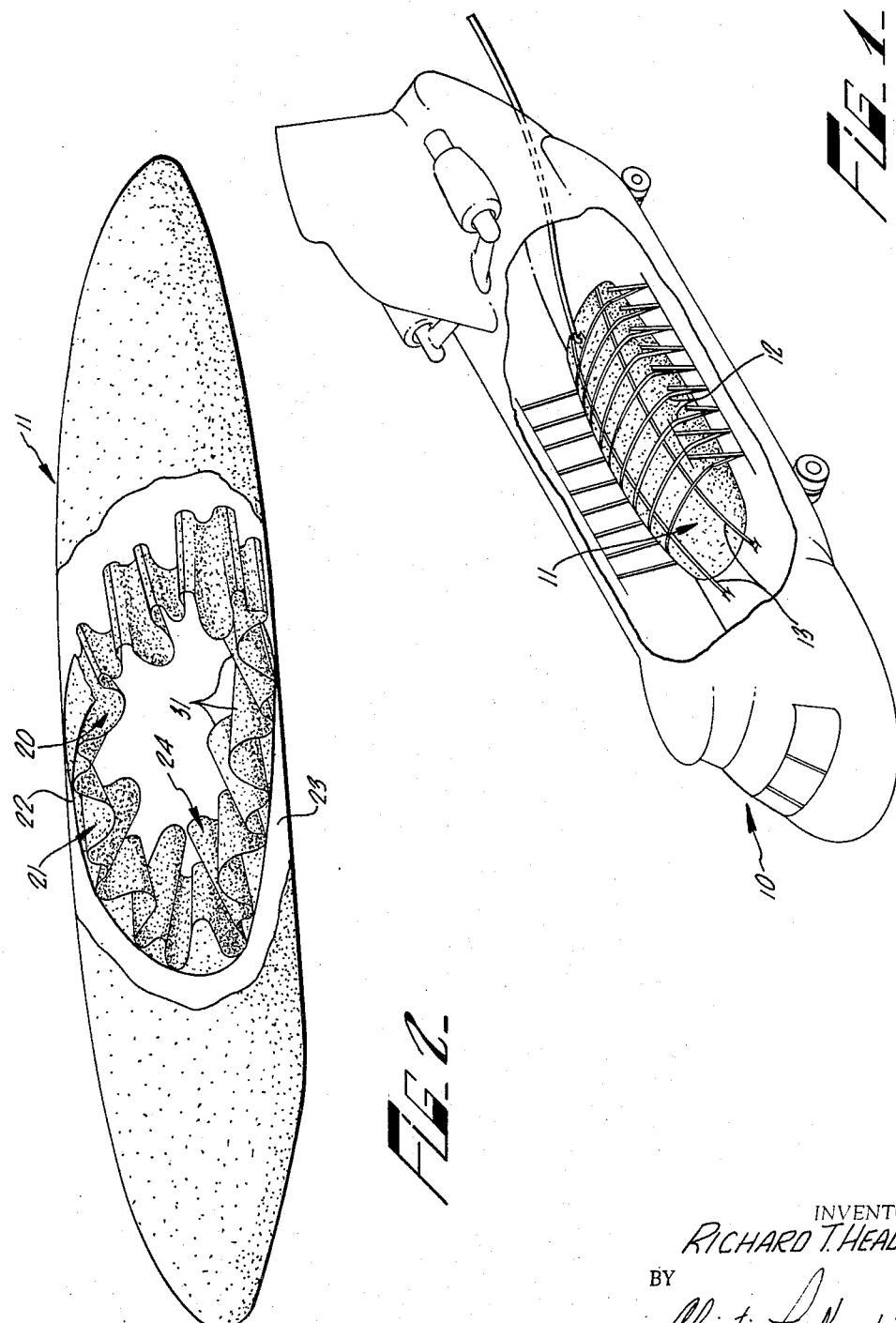
INVENTOR.
RICHARD T. HEADRICK
BY
Christie, Parker & Hale
ATTORNEYS.

Nov. 29, 1966 R. T. HEADRICK 3,288,186
SURGE DAMPING BAFFLE FOR LIQUID STORAGE TANK
Filed June 5, 1964 2 Sheets-Sheet 2
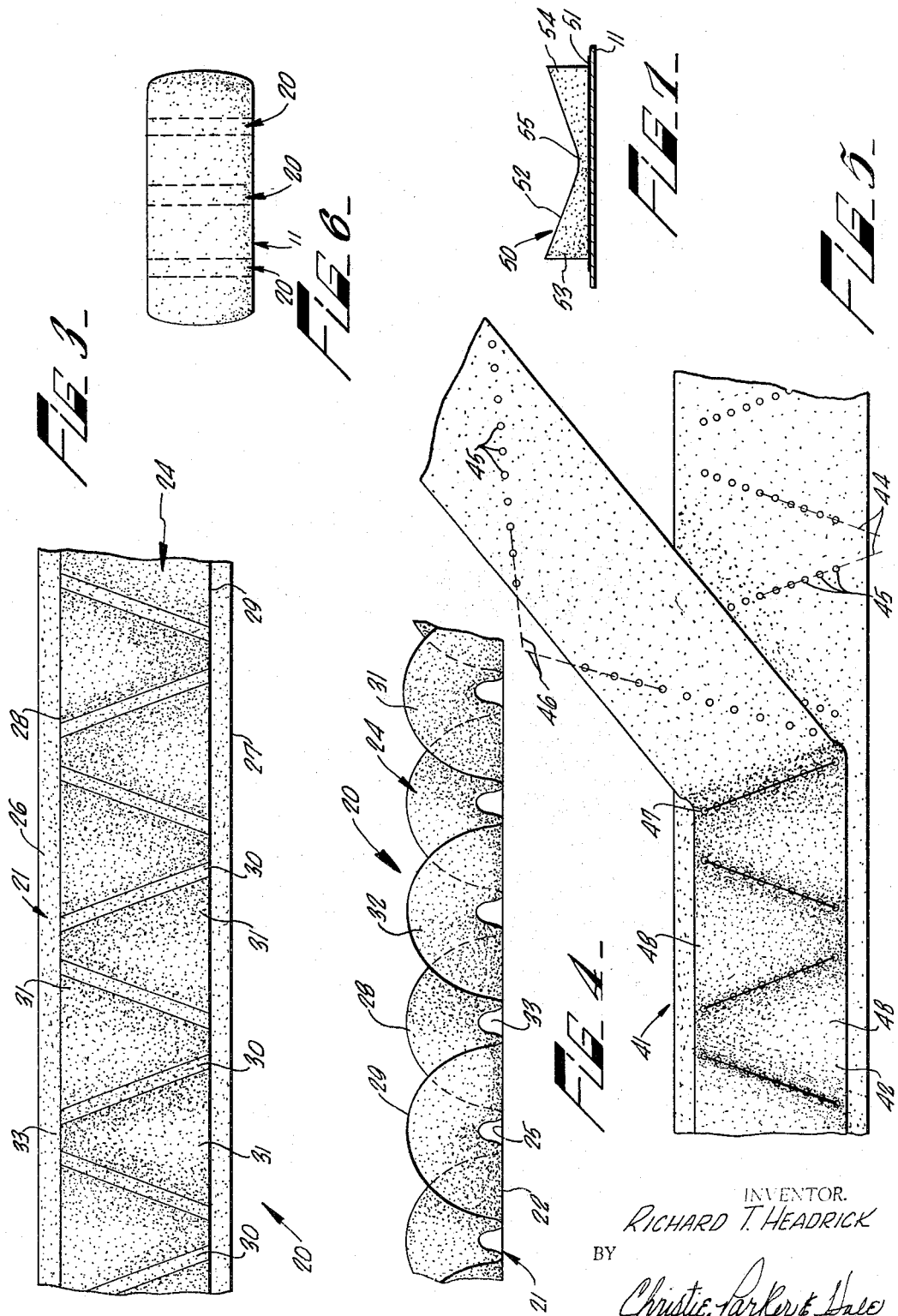
INVENTOR.
RICHARD T. HEADRICK
BY
Christie, Parker & Hale
ATTORNEYS United States Patent Office 3,288,186
Patented Nov. 29, 1966

3,288,186
SURGE DAMPING BAFFLE FOR LIQUID
STORAGE TANK
Richard T. Headrick, 916 Crestfield Ave., Duarte, Calif.
Filed June 5, 1964, Ser. No. 372,932
16 Claims. (Cl. 150—.5)

This invention relates to baffles, and, more particularly, to a baffle for use in pillow tanks for damping liquid surges in the tank.

Pillow tanks, i.e., self-supporting transportable liquid storage tanks fabricated from rubberized fabric, have been used for some time for the the storage of liquid in land-based installations. For example, such tanks are used for the storage of potable water in areas devastated by natural disasters such as floods or earthquakes where existing water supplies have been disrupted or destroyed. More importantly, in the context of this invention, pillow tanks are used increasingly by the armed forces as fuel storage tanks in temporary and semi-permanent fueling installations for aircraft and other troop support vehicles. This use of pillow tanks is especially important in the logistics of "hotspot" military activities, such as guerilla operations, where bases must be established and evacuated in a short time.

Prior to this invention, pillow tanks could not be readily used with safety in aircraft because of the problem of liquid surges in the pillow tank. These surges result from the inertial action of the fluid in the tank as the aircraft is accelerated while airborne. If a pillow tank is full, i.e., expanded to its fullest extent by the liquid contained therein, surges in the liquid cannot build up to troublesome proportions. In very many instances, however, it is not possible to maintain the pillow tank full of liquid. For example, it may be desired to supply each one of four separate bases with 500 gallons of gasoline. A single cargo plane carrying 2000 gallons of fuel may be used. If the fuel is stored on the cargo plane in a pillow tank, it is apparent that the tank will be only partially full after the first base has been serviced. It is then that surges in the tank become troublesome. The worst condition exists when the collapsible pillow tank is about half full.

To be acceptable for airborne use in all degrees of fullness, a pillow tank and its tie-down equipment must be able to withstand a crashload of 8 G's, i.e., a load induced by acceleration equal to eight times the weight of the fuel and the tank. In addition, the tank must provide for rapidly damping any surges of liquid in the tank, especially surges acting lengthwise of the tank. Surges produce a shift in the center of gravity of the fuel in the tank which shifts are to be avoided in order that the aircraft may be safely controlled while airborne.

An aircraft in flight often encounters accelerations of 2 G's and higher as, for example, when the aircraft encounters an air-pocket or downdraft. If a partially full pillow tank encounters such an acceleration, a surge is created in the fuel contained in the tank. This surge has high energy and momentum, but the actual displacement of fuel in such a surge is low. The surge cycles back and forth along the tank with a frequency characteristic of the length of the tank. In an existing 2000 gallon pillow tank, the surge takes from 1½ to 2 seconds to move from end to end of the tank. This period, unfortunately, corresponds to the response time of the usual aircraft autopilot stabilization system. Accordingly, the autopilot has a tendency to impart a control correction to the aircraft at the same time and in the same direction as the impulse imparted to the aircraft by the second cycle of a surge in the pillow tank. If the impulse associated with the second cycle of a fuel surge exceeds 2 G's, the aircraft may be dangerously overcontrolled. Moreover, if a fuel surge is not damped out after the first impulse of the surge to the aircraft, the surges and the autopilot "resonate" with the result that the aircraft goes out of control. It is for these reasons that surge damping in a pillow tank for aircraft use is important.

A principle feature of a pillow tank is its collapsibility. If a bulkhead or sheet type baffle is to be provided in a pillow tank to suppress fuel surges, the baffle must fit the tank in both full and partially full conditions. This cannot be done without providing some fullness in the sheet. Considerable fuel movement is thus required to stretch the baffle tank into its baffling position if the tank is partially full. As indicated above, however, the movement of fuel in a surge is low, with the result that sheet or bulkhead type baffles are not satisfactory.

This invention provides an improved liquid storage tank which includes a baffle for damping surges of liquid in a tank. The baffle is flexible and therefore has particular utility in a pillow tank. The baffle does not require any substantial movement of the liquid relative to it in order to be effective. The baffle is so configured that its effectiveness increases as the fullness of a pillow tank decreases. The baffle does not, however, impair drainage or scavenging of the liquid from the tank. Moreover, the baffle is simple and inexpensive to construct and does not detract from the collapsibility of a pillow tank in which it is used. The baffle and the tank itself coact to absorb the energy of a surge in the stored liquid so that the absorbed energy is transferred to the support for the tank.

Generally speaking, this invention provides an improved apparatus for storing liquids. The apparatus comprises a liquid storage tank and a plurality of flexible elongated tapered pockets having opposite open ends. Each pocket has an enlarged open end and a restriction spaced along the pocket from the large end. The pockets are secured to the inner walls of the tank and are arranged along a line which extends transversely of a line along surges in the liquid move in the tank. The pockets have their elongate extents aligned with the line of surge action. The large ends of the pockets are adapted to catch at least some of the liquid flowing in a surge to transfer energy from the liquid to the tank.

The above-mentioned and other features of the invention are more fully set forth in the following detailed description of a preferred embodiment of the invention taken in conjunction with the accompanying drawings, wherein:

FIG. 1 is a perspective view of a cargo helicopter, with parts broken away, showing a pillow tank secured in the helicopter;

FIG. 2 is a perspective view, with parts broken away, of a pillow tank showing a baffle according to this invention disposed therein;

FIG. 3 is a side elevation view of the baffle shown in FIG. 2;

FIG. 4 is a top plan view of the baffle shown in FIG. 2;

FIG. 5 is a detailed view of a portion of the baffle showing a preferred manner of construction thereof;

FIG. 6 is a plan view of a pillow tank showing how a plurality of baffles are mounted in the tank; and FIG. 7 is a cross-sectional elevation view of an alternate configuration of a baffle according to this invention.

FIG. 1 shows a cargo helicopter 10 carrying a pillow tank 11 for airborne transportation of gasoline, for example. The tank is securely positioned lengthwise of the helicopter by a plurality of tie-down straps 12 which extend transversely of the tank across its top. A pair of longitudinal tie-down straps 13 are also engaged with the tank. As indicated above, the tie-down straps and the tank must be able to withstand an 8 G crashload in the forward direction, and a 4 G load in all other directions.

For the purposes of presenting this invention, it is considered that tank 11 is a 2000 gallon tank. When loaded with gasoline, such a tank weighs approximately 15,500 lbs. The tank itself is fabricated of rubberized fabric. In the usual case, the tank is self-supporting and has a predetermined configuration when fully loaded. The tank, however, is collapsible so that its internal volume decreases as the contents of the tank are withdrawn.

FIG. 2 shows the combination of the tank 11 and baffle 20 according to this invention. FIGS. 3 and 4 show the baffle in greater detail. The baffle includes a base strip 21 of rubberized fabric adapted along one side 22 to be secured to an inner wall 23 of the tank. Preferably the base strip is secured to the tank so that it extends around the inner circumference of the tank in a plane normal to the elongate extent of the tank. A baffle strip 24 of rubberized fabric is secured to other side 25 of the base strip 21. As shown in FIG. 3, the base strip has substantially parallel opposite edges 26 and 27 which are spaced apart a distance greater than the spacing between parallel edges 28 and 29 of the baffle strip. The difference between the widths of the strips assures that the base strip does not peel from the tank as the baffle absorbs energy from surges in the liquid in tank 11. The baffle strip is secured to the base strip at locations which are regularly spaced apart along both the baffle strip and the base strip. In the embodiment of the invention shown in FIG. 3, the baffle strip is stitched to the base strip along straight lines 30 which diverge and converge relative to one another at a predetermined angle.

The baffle strip is repeatedly gathered upon itself along the entire extent of the base strip to form, relative to the base strip, a plurality of hollow, elongated, truncated, semi-conical, open-ended, pocket-like convolutions 31. The convolutions are aligned transversely of the base strip. Each convolution is disposed immediately adjacent the next convolution formed in the baffle strip. As shown in the drawings, however, alternate ones of the convolutions have their large ends 32 opening toward opposite longitudinal edges of the base strip. The convolutions, as shown in FIG. 2, extend into the interior of the tank.

Baffle 20 imparts to tank 11 the capability of damping surges in the liquid contained therein which act lengthwise of the tank. If it is assumed that the aircraft is moving forward and is suddenly subjected to a deceleration, there is a tendency for the fluid in the tank to move toward the front end of the tank. The convolutions which open toward the rear of the tank catch the fluid as it moves past the baffle. The forwardly moving fuel is constricted within the rearwardly opening convolutions because of the tapered configuration of the convolutions. Accordingly, a substantial portion of the energy in the moving fuel is transferred via the walls of the tank to the structure of the aircraft at many points along the tank, thereby preventing an overload on some of the tank tie-down devices. In the usual case, however, some surge will be manifested at the front end of the tank. This surge will be reflected back down the tank in a rearwardly moving surge. As the fuel moves toward the rear of the tank over the baffle, those of the convolutions which open to the front of the tank catch the fuel and absorb a substantial portion of the energy remaining in the moving fuel.

In a preferred embodiment of the baffle described above, the convolutions are of semi-circular configuration and have a width across their large ends of 16 inches. Narrow ends 33 of the convolutions have a width of 3 inches. The convolutions are 14 inches long transversely of an 18 inch wide base strip.

A 2000 gallon pillow tank, having a length of 16 feet, was equipped with three spaced baffles 20 according to this invention. The baffles were arranged in the tank as shown in FIG. 6 so that the tank volume was divided into substantially equal parts. The tank was half filled with a fluid having a density of 14.6 lbs./gal. so that 2 G loads (relative to gasoline) could be simulated. The tank was securely lashed to a flatbed truck. The truck was brought to a speed of approximately 25 miles per hour, and the airbrakes on the truck were locked to bring the truck to a rapid stop. Because of the specific gravity of the contents of the tank, a 2 G load was simulated in the tank. This load produced a surge of the liquid toward the front end of the tank. The second cycle of this surge which moved toward the rear of the tank was not observed to reach the rear of the tank.

On the other hand, a second tank without baffles according to this invention was subjected to the same test. The tie-downs used with the second tank included lengths of 3 inch steel pipe disposed across the top of the halffull tank at regular intervals along the tank. The pipes were lashed down to the truck. The first surge of the liquid forwardly in the tank bent the pipes. Moreover, the surge visably cycled six times back and forth along the tank.

Finally, the half-full baffled tank was supported on the trailer without the use of the tie-down straps. The first forward surge did not cause the tank to creep along the trailer. As before, the second cycle of the surge was damped out before the surge reached the rear of the tank.

It is apparent, therefore, that a pillow tank equipped with baffles 20 may be transported safely in an aircraft without fear that surges longitudinally of the tank will resonate with an autopilot system in the aircraft. A pillow tank may be adapted to absorb the surges associated with any predetermined acceleration by adjusting the number of baffles provided in the tank. Preferably, however, the baffles should be arranged at regularly spaced apart locations in the tank so that the volume of the tank is divided into equal parts.

FIG. 5 shows a preferred construction of a baffle 40 according to this invention. The baffle includes a base strip 41 and a baffle strip 42, each of which has dimensions as described above. A plurality of grommets 43 are disposed through the base strip and arranged along lines 44 which extend generally transversely of the base strip. Adjacent pairs of lines 44 diverge from one another at an angle of 50°. A plurality of grommets 45 are disposed in baffle strip 42 and are arranged along lines 46 which extend generally transversely of the baffle strip as shown. Adjacent ones of lines 46 diverge from each other at an angle of approximately 111°. The spacing between grommets 45 transversely of the baffle strip corresponds to the spacing between grommets 43 transversely of the base strip. The baffle is assembled by disposing the baffle strip over the central portion of the base strip so that respective ones of grommets 45 lying along one of lines 46 overlie the corresponding grommets 43 which lie along a correspondingly inclined line 44. The base strip and baffle strip are then laced together by a suitable filament 47 such as nylon cord. The baffle strip is then gathered upon itself so that the next arrangement of grommets 45 overlies the next arrangement of grommets 43 and the strips are laced together. In this manner, a semi-conical pocket-like configuration 48 is provided. The assembly of the two strips then proceeds in the manner described.

From the foregoing description, it is seen that this invention provides a simple, inexpensive and highly effective baffle for damping surges in a fluid within a tank. The baffle is particularly useful in a pillow tank since the baffle preferably is fabricated from a fabric which may or may not be rubberized. The baffle does not in any way impair the collapsibility of the pillow tank. Moreover, since the pocket-like configurations defined by the baffle are open at their opposite ends, the baffle does not provide any impediment to low velocity flow of fluid through the tank, nor does the baffle hinder scavenging of the last traces of fuel from the tank.

It will also be observed that substantially no movement of fuel relative to the baffle is required before the baffle becomes operative. This feature of the invention is compared with the performance of sheet or bulkhead type baffles, particularly when such baffles are provided in a partially full pillow tank.

A pillow tank equipped with baffles in accord with this invention has the unique feature that surges lengthwise of the tank are damped with increasing efficiency as the fullness of the tank decreases. This is true since the projected area of the convolutions along the length of the tank is a greater percentage of the cross sectional area of the tank when the tank is partially full than when the tank is full and a proportionally greater portion of the energy of a surge is transferred to the walls of the tank.

FIG. 7 shows an alternate configuration of a baffle 50 according to this invention. The baffle includes a base strip 51 to which are secured a plurality of open-ended elongated pockets, such as pocket 52. The pockets have their elongate extent arranged transversely of the base strip. Each pocket 52 has opposite open ends 53 and 54 which preferably are of equal area. The midlength of the pocket defines a restricted area portion 55 so that the pocket has a longitudinal profile resembling an hourglass. Pocket 51 is effective to absorb energy from a surge in liquid moving in either direction past the pocket along the elongate extent of the pocket.

The invention has been described above in the context of a pillow tank used in a military application. Such an application of this baffle is merely one of many ways in which the baffle may be used. Various modifications of the tank and baffle structure of the invention will be readily apparent to those skilled in the art without departing from the spirit of this invention.

What is claimed is:

1. Apparatus for storing liquids comprising tank adapted to contain liquid therein and a plurality of flexible elongated pockets having opposite open ends secured to the interior surface of the tank, the pockets being arranged along a line extending transversely of a line along which moves surges in the liquid contained in the tank, the pockets having their elongate extents aligned with the line of surge action, each pocket having an enlarged open end and a restriction spaced from the enlarged open end along the pocket, the enlarged open ends of the pockets being adapted to catch at least a portion of the liquid flowing in the surge to transfer energy from the liquid to the tank.

2. Apparatus for storing liquids comprising an elongated flexible and collapsible tank adapted to contain a liquid therein and a plurality of flexible elongated pockets having opposite open ends secured to the interior surface of the tank, the pockets being arranged along a line along which move surges in the liquid contained in the tank, the pockets having their elongate extents aligned with the length of the tank, each pocket having an enlarged end and a portion of restricted cross-sectional area spaced from the enlarged end along the pocket, alternate ones of the pockets having their large ends opening to opposite ends of the tank.

3. A baffle for damping surges of liquid in a tank comprising an elongated strip adapted to be secured to the interior of the tank to extend transversely of the direction of the surge, the strip being gathered in the direction of its length to define a plurality of hollow truncated tapered convolutions extending into the interior of the tank, alternate ones of the convolutions having the large ends thereof opening at opposite edges of the strip.

4. Apparatus for storing liquids and for damping surges in a liquid contained therein comprising an elongated pillow tank, and an elongated fabric strip secured to the interior of the tank and extending transversely of the direction of the surge, the strip being gathered on itself in the direction of its length to define a plurality of hollow truncated tapered convolutions extending into the interior of the tank, alternate ones of the convolutions having the large ends thereof at opposite edges of the strip.

5. A baffle for damping surges of liquid lengthwise of an elongated pillow tank comprising an elongated fabric strip secured to the interior of the tank and extending circumferentially thereof intermediate the ends of the tank, the strip being gathered in the direction of its length to define a plurality of substantially identical hollow truncated semi-conical convolutions extending into the interior of the tank, alternate ones of the convolutions having the large ends thereof at opposite edges of the strip.

6. A baffle for damping surges in a fluid in a tank comprising a base strip adapted along one side thereof to be secured to the interior of the tank to extend in a direction transverse to the direction of the surges, and a second strip to the other side of the base strip and gathered relative to the base strip so as to define, along the elongate extent of the base strip, a plurality of hollow truncated tapered convolutions having their elongate extents transverse of the base strip, alternate ones of the convolutions having their large ends open to opposite edges of the base strip.

7. A baffle for damping surges acting in a fluid lengthwise of an elongated fluid impervious fabric pillow tank containing the fluid comprising an elongated base strip of fabric secured along one side thereof to the interior of the tank to extend circumferentially of the interior of the tank, a second elongated fabric strip, and means connecting the second strip to the other side of the base strip so that the second strip is gathered relative to the base strip to define, along the elongate extent of the base strip, a plurality of substantially identical hollow truncated tapered convolutions of substantially semi-circular cross-sectional configuration having their elongate extents transverse of the base strip, alternate ones of the convolutions having their large ends opening to opposite edges of the base strip.

8. A baffle according to claim 7 wherein the means connecting the second strip to the base strip comprises stitching between the strips.

9. A baffle according to claim 7 wherein the means connecting the second strip to the base strip comprises a first plurality of grommets through the base strip arranged along lines regularly spaced along the base strip which diverge and converge relative to one another at an angle equal to twice the angle of taper of the convolutions, a corresponding second plurality of grommets through the second strip arranged along lines regularly spaced along the second strip which diverge and converge relative to one another at an angle greater than twice the angle of taper of the convolutions, and means lacing the base and and second strips together through the grommets so that the grommets of the second plurality overlie corresponding grommets of the first plurality.

10. In an elongated rubberized fabric liquid storage tank, an improved baffle for damping liquid surges lengthwise of the tank comprising a flexible strip having opposite substantially parallel edges and secured to the interior of the tank and extending circumferentially thereof, the strip being gathered along its elongate extent relative to the tank to define a plurality of deformable tapered and open-ended pockets having their elongate extents aligned with the elongate extent of the tank, alternate pockets tapering toward opposite ends of the tank.

11. In an elongated rubberized fabric liquid storage tank, an improved baffle for damping liquid surges lengthwise of the tank comprising a flexible strip having opposite substantially parallel edges, the strip being secured to the interior of the tank and extending circumferentially thereof, the strip being gathered along its elongate extent relative to the tank to define a plurality of substantially identical deformable hollow truncated semi-conical pocket-like convolutions having their elongate extents aligned with the elongate extent of the tank, alternate convolutions tapering toward opposite ends of the tank.

12. The combination comprising an elongated pillow tank fabricated of rubberized fabric adapted for the storage of liquid therein, and means for damping surges of liquid lengthwise of the tank including a base strip secured to the inner surface of the tank and extending circumferentially thereof, an elongated baffle strip, and means for lacing the baffle strip to the base strip so that the baffle strip is gathered relative to the base strip to define around the circumference of the tank a plurality of substantially identical hollow truncated convolutions of substantially semi-circular cross-sectional configurations extending into the tank, the convolutions having their elongate extents aligned with the length of the tank with alternate convolutions having their large ends opening to opposite ends of the tank.

13. A baffle for damping surges and waves in a body of liquid comprising flexible means defining a plurality of flexible elongated pockets having opposite open ends, each pocket having an enlarged end and a portion of restricted cross-sectional area spaced from the enlarged end along the pocket, and means for securely mounting the flexible means so that the pockets are arranged with their elongate extents disposed parallel to a line along which the surges move and their enlarged ends open toward the surge and are adapted to receive liquid.

14. A baffle for damping surges in a body of liquid comprising a foundation and an elongated flexible strip gathered upon itself to define a plurality of pockets and secured to the foundation, the pockets each having an elongate extent transverse to the elongate extent of the strip and opposite open ends, one of the ends of each pocket being larger than the other.

15. A baffle for damping surges in a body of liquid comprising an elongated base strip adapted to be mounted in the body of fluid, and an elongated flexible strip having a width less than the width of the base strip and gathered on itself to define a plurality of convolutions and secured to the base strip, the convolutions in combination with the base strip defining a plurality of passages transversely of the base strip, the passages each having an enlarged open end and a portion of restricted cross-sectional area spaced from the enlarged open end along the passage.

16. Apparatus for storing liquids comprising a tank adapted to contain liquid therein, and a plurality of flexible elongated pockets having opposite open ends, the pockets each having an enlarged open end and a portion of restricted cross-sectional area spaced from the enlarged end along the pocket, and means connecting the pockets to the interior surfaces of the tank so that the pockets have their elongate extents disposed parallel to a line along which move surges in liquid contained in the tank.

References Cited by the Examiner

UNITED STATES PATENTS

| | | | |
|---|---|---|---|
| 2,379,126 | 6/1951 | Weldon | 150—0.5 X |
| 2,724,418 | 11/1955 | Krupp | 150—0.5 |

FRANKLIN T. GARRETT, *Primary Examiner.*